United States Patent [19]

Benson et al.

[11] Patent Number: 4,572,864

[45] Date of Patent: Feb. 25, 1986

[54] COMPOSITE MATERIALS FOR THERMAL ENERGY STORAGE

[75] Inventors: David K. Benson, Golden; Richard W. Burrows, Conifer; Yvonne D. Shinton, Northglenn, all of Colo.

[73] Assignee: The United States of America as represented by the United States Department of Energy, Washington, D.C.

[21] Appl. No.: 688,668

[22] Filed: Jan. 4, 1985

[51] Int. Cl.$^4$ ............................ C09K 3/18; B32B 9/00
[52] U.S. Cl. .................................. 428/305.5; 252/70; 252/73; 427/238; 427/430.1; 428/320.2; 428/403; 428/404; 428/703; 428/913
[58] Field of Search ................ 252/70, 73; 428/305.5, 428/306.6, 307.3, 307.7, 308.4, 320.2, 321.1, 403, 404, 703, 913; 427/230, 238, 430.1

[56] References Cited

U.S. PATENT DOCUMENTS

4,259,401  3/1981  Chahroudi et al. ............. 428/305.5
4,470,917  9/1984  Hawe et al. ........................ 428/402

Primary Examiner—William J. Van Balen
Attorney, Agent, or Firm—Ken Richardson; John M. Albrecht; Judson R. Hightower

[57] ABSTRACT

The present invention discloses composite material for thermal energy storage based upon polyhydric alcohols, such as pentaerythritol, trimethylol ethane (also known as pentaglycerine), neopentyl glycol and related compounds including trimethylol propane, monoaminopentaerythritol, diamino-pentaerythritol and tris(hydroxymethyl)acetic acid, separately or in combinations, which provide reversible heat storage through crystalline phase transformations. These phase change materials do not become liquid during use and are in contact with at least one material selected from the group consisting of metals, carbon siliceous, plastic, cellulosic, natural fiber, artificial fiber, concrete, gypsum, porous rock, and mixtures thereof. Particulate additions, such as aluminum or graphite powders, as well as metal and carbon fibers can also be incorporated therein. Particulate and/or fibrous additions can be introduced into molten phase change materials which can then be cast into various shapes. After the phase change materials have solidified, the additions will remain dispersed throughout the matrix of the cast solid. The polyol is in contact with at least one material selected from the group consisting of metals, carbon siliceous, plastic, cellulosic, natural fiber, artificial fiber, concrete, gypsum, and mixtures thereof.

28 Claims, 5 Drawing Figures

COMPOSITE MATERIALS FOR THERMAL ENERGY STORAGE

CONTRACTUAL ORIGIN OF THE INVENTION

The United States Government has rights in this invention pursuant to Contract No. DE-AC02-83CH10093 between the United States Department of Energy and the Solar Energy Research Institute, a Division of the Midwest Research Institute.

BACKGROUND OF THE INVENTION

1. Field of the Invention

The present invention relates to composite materials which are capable of storing thermal energy when exposed to heat, sunlight and/or electricity.

2. Description of the Prior Art

A series of organic polyols are related compounds with tetrahedral molecular structures has been found to be suitable for thermal energy storage. These polyols include pentaerythritol ($C_5H_{12}O_4$), pentaglycerine ($C_5H_{12}O_3$), neopentyl glycol ($C_5H_{12}O_2$), neopentyl alcohol ($C_5H_{12}O$) and neopentane ($C_5H_{12}$). Certain of these polyols can be alloyed together to provide reversible solid-solid mesocrystalline phase transformations of high enthalpy and adjustable temperatures of transition.

These polyols are referred to as phase change materials (PCMs), which reversibly absorb large amounts of thermal energy during solid-state transformations at temperatures well below their melting temperatures. These transformation temperatures may be adjusted over a wide range by selecting various compositions of solid-solution mixtures of the polyols.

A large number of phase change materials were evaluated by NASA in the 1960's as "thermal capacitors" to passively buffer the temperature swings experienced by earth orbiting satellites. See Hale et al., Phase Change Materials Handbook, NASA Report B72-10464 (August 1972). Among the hundreds of phase change materials evaluated by NASA were a few materials which exhibited solid-to-solid transformations with large enthalpies. Though these materials were not used for space applications, a decade later they became of interest to scientists searching for better phase change materials for thermal energy storage. Solid-state phase change materials have the advantages of less stringent container requirements and greater design flexibility.

Energy is commonly stored in heated bricks, rock beds, concrete, water tanks, and the like. Such thermal energy storage methods require leakproof containers and/or extensive space and mechanical support for the massive amounts of storage materials. In such materials, the amount of energy stored is proportional to the temperature rise and to the mass of the storage material, and is generally limited to about 1 calorie per gram per °C. (1 BTU per pound per °F.).

In contrast, phase change materials store much larger amounts of thermal energy over a small temperature change by virtue of reversible physical/chemical/structural changes such as melting. For example, certain hydrated inorganic salts used for thermal energy storage absorb as much as 96 BTU per pound at the melting temperature.

However, there are disadvantages to the use of solid/liquid phase change materials. They must be reliably maintained in a durable container and their melting-crystallization change must be fully reversible. In the past, many solid/liquid phase change materials have leaked and/or have lost storage capacity because of irreversible changes over periods of time. In addition, the conduction of heat into and out of solid/liquid phase change materials is commonly limited by the poor thermal properties of the liquid phase of the material and/or its interface with the container used to hold the phase change material.

In general, the thermal conductivity of a phase change thermal storage material is an important parameter, as well as its transition temperature. To a certain extent, the thermal conductivity of phase change materials is adjustable by introducing additives to form composite materials. For example, the heat transport in paraffin phase change materials can be adjusted by introducing metal matrices, such as aluminum honeycomb or expanded aluminum mesh into the phase change material container. See: deJong, A.G. Improvement of Heat Transport in Paraffins for Latent Heat Storage Systems, in Thermal Storage of Solar Energy (C. den Ouden, ed.) pp. 123–1344 (1981); and Benson et al., Solid State Phase Change Materials for Thermal Energy Storage in Passive Solar Heated Buildings, Proceedings of the Tenth Energy Technology Conference, Washington, D.C., pp. 712–720, (Feb. 28-Mar. 2, 1983). Other literature discusses a class of hydrocarbon compounds for use in thermal energy storage components for passive solar heated buildings, with particular reference to polyhydric alcohols such as pentaerythritol, trimethylol ethane, neopentyl glycol, and closely related materials. This work also discusses solid-state phase change materials which provide compact thermal energy storage with reduced concern for the containment of the phase change material. Another work Christensen, Advanced Phase Change Storage for Passive Solar Heating: Analysis of Materials and Configurations, in Proceedings of the ASES Passive 83 Conference, Glorieta, N.M., (Sept. 7-9, 1983) discusses the performance of phase change materials for thermal storage in passive solar heating systems, including factors other than material properties that affect storage performance and optimization.

A related work Benson et al. Materials Research for Passive Systems-Solid State Phase Change Materials and Polymer Photodegradation, in Proceedings of the Passive and Hybrid Solar Energy Update, Washington, D.C., pp. 228–235, (Sept. 15–17, 1982), discusses solid-state phase change materials being evaluated for use in passive solar thermal energy storage systems, with particular emphasis on pentaerythritol, pentaglycerine and neopentyl glycol. Another work, Benson, Organic Polyols: Solid State Phase Change Materials for Thermal Energy Storage, in Opportunities in Thermal Storage R and D, EPRI Special Report EM-3159-SR, pp. 19-1 to 19-10 (July 1983); discusses a homologous series of organic polyols based on pentaerythritol, including pentaglycerine and neopentyl glycol, demonstrating potential for thermal energy storage at temperatures from below 25° C. to 188° C.

SUMMARY OF THE INVENTION

Against the foregoing background, it is therefore a general object of the present invention to provide additions to specific solid-state phase change materials to form composite structures with altered thermal conductivites.

It is another general object to provide a low-cost, substantially efficient, simplified composite material for thermal energy storage.

It is a more specific object to provide composite materials for thermal energy storage which utilize pentaerythritol, pentaglycerine, neopentyl glycol and mixtures thereof as phase change materials.

Additional objects, advantages and novel features of the invention shall be set forth in part in the description that follows, and in part will become apparent to those skilled in the art upon examination of the following disclosure, or may be learned by the practice of the invention. The objects and the advantages of the invention may be realized and attained by means of the instrumentalities and in combinations particularly pointed out in the appended claims.

The present invention relates to solid-state composite phase change materials based upon polyhydric alcohols, such as pentaerythritol, trimethylol ethane (also known as pentaglycerine), neopentyl glycol and related compounds including trimethylol propane, monoaminopentaerythritol, diamino-pentaerythritol and tris(hydroxymethyl)acetic acid, separately or in combinations, which provide reversible heat storage through crystalline phase transformations. These phase change materials do not become liquid during use and are in contact with at least one material selected from the group consisting of metals, carbon siliceous, plastic, cellulosic, natural fiber, artificial fiber, concrete, gypsum and mixtures thereof. Particulate additions such as aluminum or graphite powders, as well as metal and carbon fibers can also be incorporated therein. Particulate and/or fibrous additions can be introduced into molten phase change materials which can then be cast into various shapes. After the phase change materials have solidified, the additions will remain dispersed throughout the matrix of the cast solid.

BRIEF DESCRIPTION OF THE DRAWINGS

The accompanying drawings, which are incorporated in and form a part of the specification illustrate preferred embodiments of the present invention, and together with the description, serve to explain the principles of the invention.

Corresponding reference characters indicate corresponding parts in the several drawings.

DESCRIPTION OF THE PREFERRED EMBODIMENTS

In accordance with the present invention, composite phase change materials are based upon polyhydric alcohols, such as pentaerythritol, trimethylol ethane (also known as pentaglycerine), neopentyl glycol and related compounds including trimethylol propane, monoaminopentaerythritol, diamino-pentaerythritol and tris(hydroxymethyl)acetic acid, separately or in combinations to provide reversible heat storage by solid-state, crystalline phase transformations.

These composite phase change materials may incorporate particulate additions such as aluminum or graphite powders, as well as metal and carbon fibers and laminates.

The addition of fibrous material can substantially increase the mechanical strength of the solid-state phase change material. Composite phase change materials made with fibrous mats of glass fiber, carbon fiber and aluminum fiber (which more accurately has the consistency of an expanded metal sponge) have improved strength. The composites made from highly conducting materials such as carbon, aluminum or other conducting metals would also have high thermal conductivities.

These additions are introduced into molten phase change materials which can be cast into various shapes. The additions remain incorporated therein or dispersed throughout the solidified phase change materials.

Temperatures of the crystalline phase transformation can be adjusted over the range of from about 7° to 200° C. (45° to 392° F.), by selecting certain of the above mentioned phase change materials, alone or in suitable mixtures, depending upon the specific phase transformation temperature desired.

Applications for composite phase change materials are found in passive solar thermal storage units, such as heat storage walls, also known as Trombe walls. The Trombe wall is a wall located on the interior side of a glazed opening in a building. Generally, the wall is massive and faces south. Sunlight entering through the glazing is absorbed by the wall which stores the energy as heat. The Trombe wall is usually designed so that the absorbed solar heat is conducted through the wall slowly, with a delay of about 8 hours. Stored heat is then released into the interior living space after sunset.

Table 1 which follows contains tabulations of thermal conductivities for various solid-state phase change materials and composites.

TABLE 1

MEASURED THERMAL CONDUCTIVITIES OF SOLID STATE PHASE CHANGE MATERIALS AND COMPOSITES

| Material | Temperature (°C.) | Density (kg/m$^{-3}$) | Thermal Conductivity [w/m/K/l] |
|---|---|---|---|
| Pentaerythritol | 170 | 1342–1323 | 0.963–1.07 |
| (PE) | 205 | 1218 | 0.508 |
| Trimethylol Ethane | 65 | 1193 | 0.361 |
| (TME) | 95 | 1118 | 0.335 |
| Neopentyl Glycol | 27 | 1046 | 0.253 |
| (NPG) | 60 | 984 | 0.209 |
| Graphite | — | 2250 | 1.320 |
| Aluminum | — | 2700 | 2.010 |
| NPG (60%) + TME | 54 | 1071 | 0.230 |
| (40%) | 61 | 1054 | 0.215 |
| TME + Graphite | 65 | 1216–1192 | 0.441–0.428 |
| (3%) | 95 | 1144 | 0.327 |
| TME + Graphite | 65 | 1257 | 0.638 |
| (10%) | 95 | 1196 | 0.427 |
| TME + Aluminum | 66.7 | 1199 | 0.394 |
| (3%) | 97.2 | 1147 | 0.379 |
| TME + Aluminum | 65 | 1245 | 0.438 |
| (10%) | 98.3 | 1200 | 0.716 |

As noted from Table 1, the thermal conductivity of the phase change materials can be increased up to 100% or more by the incorporation of particles or fibers of more conductive substances, such as graphite or aluminum. The incorporation of the fibers or particles of more conductive substances into the phase change material is accomplished by mixing the particulate or fibrous additions into the melted phase change material. Upon solidification of the phase change materials, the particulate or fibrous additions become permanently fixed in the phase change material matrix, thereby forming the composite phase change material.

A number of applications are contemplated for using the composite phase change materials, especially for solar and energy conserving buildings such as:

(a) Cool storage, which is the storage of cooling capacity for building air conditioners. By operating chillers at night to build up cool storage capacity, the building operator can use less expensive electric power at a time when utility provides lower "off-peak" rates, rather than during the more expensive daytime "peak" periods.

The chiller can be designed to operate continuously so that both stored capacity and chiller capacity are combined to meet peak cooling needs. Proper design and control strategy can reduce the size and cost of the building's chiller. Maximum electric power requirements at the peak demand of the building can also be reduced. Utility peak demand charges are commonly greater than the charges for actual power consumption; therefore, a reduction in peak demand can be very significant.

In implementing composite phase change materials for cool storage purposes, the composite phase change material may be used centrally or distributed. A central cool storage unit would require a composite phase change material with high thermal conductivity so that heat could be conducted into and out of relatively thick sections of the composite.

Distributed cool storage composites could be employed as relatively thin floor, wall or ceiling coverings, in the form of floor tile, wall board, or ceiling tiles, respectively.

(b) Heat storage is the storage of heating capacity. Nearly 80% of newly constructed homes in the United States are electrically heated. During cold weather, electric utilities experience high power demands because of space heating loads. Higher utility rates are also charged during these periods. By storing heat generated during "off-peak" periods, utility bills can be reduced. This can be accomplished by employing a composite phase change material in a central location in an electric "storage heater".

(c) Temperature moderation is important in solar heated buildings which have a tendency to overheat during the sunny part of the day, and yet can become uncomfortably cold at night. The mid-temperature solid-state composite phase change materials can be used to absorb excess heat during the day and release it gradually during the cooler night hours. This can be accomplished by a distributed composite to store and release the excess heat over a large area. One means for accomplishing this can be by using the composite phase change material as a translucent layer for a Trombe wall or a skylight diffuser so that the same building aperture can conveniently serve both daylighting and solar heating functions.

For central cooling or heat storage, a composite phase change material containing 10% to 30% graphite powder can be sealed in metal tubes across which suitable fluid means, such as a refrigerant, heat transfer fluid, or air can be passed.

For temperature moderation, several composite designs have been developed, including:

(1) Structural polymeric extrusions in the form of single layer, multichannel extrusions, and multilayer, multichannel extrusions filled with solid-state phase change material. The addition of graphite powder to the phase change material can increase its effectiveness as a solar absorber.

(2) Solid-state phase change material can be bonded between two layers of metal to form a sandwich composite configuration. The surface layers can be selected to perform a combination of functions such as strength enhancement, solar absorption, enhanced heat transfer, decoration, and the like.

(3) Solid-state phase change material can be impregnated into a wide variety of porous and fibrous materials. Suitable porous materials are those which have an interconnected pore structure and can be wetted by the phase change material in a liquid state. Specific porous materials can be found in many common materials of construction, such as wood, paper and paper products including fiberboard, cement and concrete as well as their products, gypsum board and related gypsum products, natural clays and porous rock.

Suitable fibrous materials include glass fiber, cotton fiber, metal fiber, plastic fiber, and natural fibers such as cotton, wool, cellulose, and the like.

A number of approaches have been developed for impregnation, with perhaps the simplest approach utilizing a saturated water solution of the phase change material at room temperature. The saturated phase change material solution is simply contacted with the porous or fibrous material, and is absorbed therein. The water is eliminated by evaporation or heating, leaving a residue of phase change material at the concentration it existed in the saturated solution.

Thus, a saturated water solution of neopentyl glycol (NPG) at room temmperature contains 68% NPG. Therefore, 68% of the volume of the saturated solution of NPG will remain as a residue in the fibrous or porous matrix after the water has been removed.

The concentration of phase change material in the water solution can be increased above its saturation concentration by heating the solution to dissolve an even greater concentration of the phase change material. An additional advantage of using heated solutions of the phase change materials is that they can diffuse more rapidly into the fibrous or porous matrix.

In another approach, the capillary action of certain porous materials activates the absorption of molten phase change materials thereinto. This is accomplished by heating the porous material to avoid premature solidification of the liquid phase change material in a manner which can block the capillary pores and reduce absorption. Thus, the porous material is heated to a temperature sufficient to maintain the liquid or molten phase change material in a liquid flowable state so that it can be absorbed into the porous material to the fullest extent desired.

In cases where the material is highly porous, and in relatively thin sections on the order of less than or equal to one inch thickness, little or no heating is necessary. This is especially the case with fiberglass batting.

In carrying out the absorption, the porous material is partially immersed into the liquid phase change material. The liquid phase change material can either be a saturated solution, or a heated, molten phase change material. The liquid phase change material contacts the surface of the porous material and is absorbed into the pores by means of capillary action. The porous material is removed from the body of liquid phase change material and allowed to cool, if necessary. The liquid phase change material is retained in the pores by capillary forces until it solidifies and becomes rigidly bound to the matrix.

In certain situations, where a greater degree of impregnation is desired, or where a suitable amount of phase change material cannot be impregnated by merely contacting the fibrous or porous materials with the liquid phase change material, the additional feature of conducting this process under vacuum conditions or at elevated pressures can substantially improve the extent of impregnation of the phase change material into the porous or fibrous matrices.

A suitable process scheme comprises placing the solid phase change material and the porous construction material, forming the matrix, in separate portions of a sealed chamber. The phase change material can then be liquified by melting or made into a saturated solution, and the air evacuated from the chamber. The construction material matrix can then be contacted with the liquid phase change material by such suitable means as immersion into the liquid phase change material for a sufficient period of time to effectuate sufficient impregnation of the porous spaces with the liquid phase change material. Air can then be admitted to the chamber, as well as any other suitable gas, such as nitrogen. The construction material matrix can then be withdrawn from the molten phase change material, removed, and allowed to cool.

Naturally, the resulting construction material composite impregnated with the phase change material is always employed at temperatures sufficiently below the melting temperature of the phase change material so that leakage of the phase change material from the composite does not become a problem.

Table 2 which follows lists various porous matrix materials impregnated with neopentyl glycol. Other phase change materials, including mixtures can also be used, depending upon the solid-state transition temperature desired.

TABLE 2

TYPICAL COMPOSITES FOR THERMAL ENERGY STORAGE
(Porous Matrices Impregnated with NPG[a])

| Matrix Material | Weight Percent added NPG "%" | Thermal Storage Capacity[b] | | Ratio (with/ without NPG) |
|---|---|---|---|---|
| | | (Without NPG) (BTU/ pound) | (With NPG) (BTU/pound) | |
| Gypsum board ½ in. thick | 35 | 12 | 35 | 2.9 |
| White pine wooden block | 32 | 15 | 35 | 2.3 |
| plywood ½ in. thick | 37 | 13 | 37 | 2.8 |
| particle board ¾ in. thick | 36 | 13 | 37 | 2.8 |
| Paperboard | 53 | 14 | 47 | 3.4 |
| Vermiculite | 74 | 9 | 58 | 6.5 |
| Concrete[c] | 13 | 7 | 15 | 2.2 |

[a]NPG = neopentyl glycol melting temperature 126° C., (259° F.) solid state transition temperature 43° C. (109° F.).
[c]Concrete to which filled vermiculite has been added (⅓ sand, ⅓ cement, ⅓ water), plus 66 volume % filled vermiculite.

(d) Stone-like construction materials formed by the coalition of particles into a solid mass such as cement, mortar and concrete can also contain solid-state phase change materials. Since the solid-state phase change materials contemplated by the present invention are water soluble, they cannot be added directly to a water based concrete mix without dissolving and interfering with the "setting" of, for example, the concrete. However, the melted phase change material can be impregnated into a porous aggregate material, such as vermiculite (expanded mica) or perlite. These porous aggregate particles impregnated with phase change materials, can then be safely added to the concrete mix. The resulting concrete is similar to "lightweight" concrete, which commonly contains vermiculite or perlite as a lightweight aggregate, but has much higher thermal storage capacity due to the addition of the phase change material.

Systems analysis of the performance of a solid-state phase change material Trombe wall have demonstrated the importance of parameters such as enthalpy of transformation, temperature of transformation, and thermal conductivity. The nature of solid-state phase change materials allows for some control over the first two parameters, and the use of additives such as graphite or aluminum provides for some design control over the third. Other important parameters include mechanical strength, optical properties and surface heat transfer characteristics.

Laminated phase change material composites can be fabricated by using textured metal facing on sheets of cast solid-state phase change material.

Figure 1:
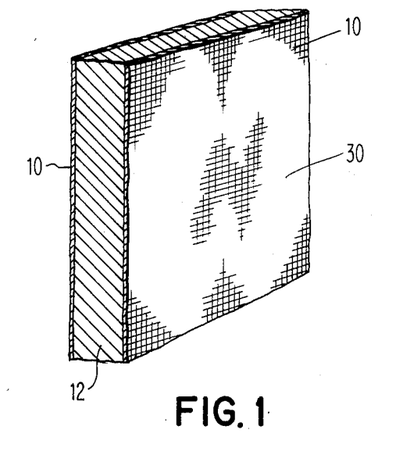
FIG. 1 is a perspective view of a solid-state phase change material laminated between textured metal sheets.

FIG. 1 is a perspective view of a solid-state phase change material 12 which has been laminated between textured metal facing sheets 10 to form a panel 30. The texturing effect on the facing material is primarily for aesthetic appearance, and can be produced in a wide variety of patterns. The facing sheets do not have to be textured, and can also be made of other materials, such as glass, and structural polymeric material.

Figure 2:
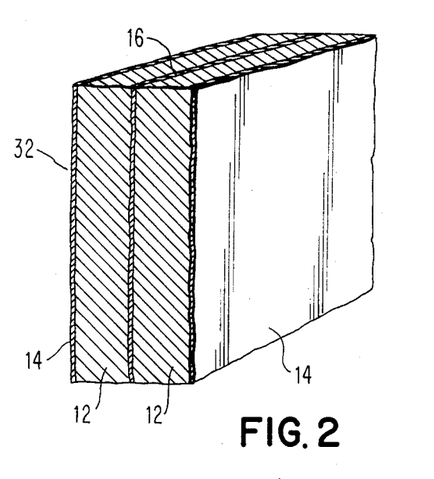
FIG. 2 is a perspective view of a solid-state phase change material laminated between nontextured metal sheets, and containing an interior sheet.

FIG. 2 is a perspective view of a solid-state phase change material 12 cast in or laminated between nontextured metal facing sheets 14 to form a panel 32. A metal interior facing sheet 16 is coextensive with facing sheet 14. However, the interior sheet does not have to be coextensive with the facing sheet, but can be larger or smaller, as the need arises. Moreover, as was the case with FIG. 1, the facing materials and the interior sheet can be composed of nonmetallic materials, such as glass, a plastic material, or any combination thereof.

Panels 30 and 32 described in FIGS. 1 and 2, respectively, can comprise Trombe walls in passive solar heated buildings and for distributed cool storage in energy-efficient buildings.

By carefully selecting the characteristics of the facing material, several design advantages can be achieved which include:

1. Strength—The metal facing material can provide tensile strength in the surface planes of the composite to thereby increase its tensile, bending and buckling strength. A strong surface layer also offers resistance to surface damage and damage to the phase change material.
2. Heat Transfer Enhancement—The use of a textured surface coating can provide enhanced heat transfer under passive convection conditions. This enhancement may be important in Trombe wall and direct gain applications. A direct gain application for a heat storage component is one whereby the component receives direct solar radiation, usually after the radiation passes through a glazed building aperture. Textured sheet metal facing is also much more rigid than flat sheet and further increases the strength of a laminated composite.
3. Selective Solar Absorptance—The use of an exterior metal facing with a selective absorber coating can enhance the performance of a phase change material in a Trombe wall by improving efficiency of solar gain and reduce radiative losses. Also, of unique value, solid-state phase change materials in Trombe walls, provide a higher transition temperature, and, therefore, a higher transition enthalpy.
4. Safety—A metal interior facing can also serve as a flame spread barrier which greatly improves the safety of using a combustible phase change material in a Trombe wall application.
5. Aesthetics—Textured facing material is extensively used to improve the appearance of walls. Textured sheet metal is produced in a wide variety of patterns in large quantities for such purposes.

Multichannel polymer composite structures can be formed by casting solid-state phase change materials into at least one channel contained in these structures. The channels in a typical structural member can be of equal capacity or varying capacity, or a combination of equal and varying capacity, as the need arises. Structural metallic members, such as magnesium, aluminum, steel, titanium, and the like, also having multichannels, can be substituted for similar structural polymeric materials in suitable circumstances.

Multichannel extruded sheets of structural polymeric materials such as polymethylmethacrylate and polycarbonate, are made commercially in the United States and Germany. Other polymeric materials from which multichannel extrusions have been made and which can be suitable for phase change material composites include polypropylene and polyethylene.

Figure 3:
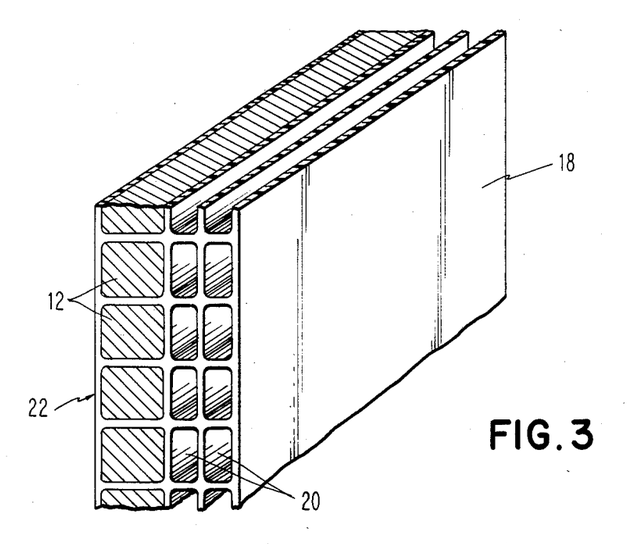
FIG. 3 is a perspective view of a solid-state phase change material cast into the channels of a transparent multichannel extruded polymer sheet, wherein the channels have a polygon shape.

FIG. 3 is a perspective view of a structural member 18 composed of a transparent multichannel extruded polymeric material, wherein the channels are polygon shaped.

Figure 4:
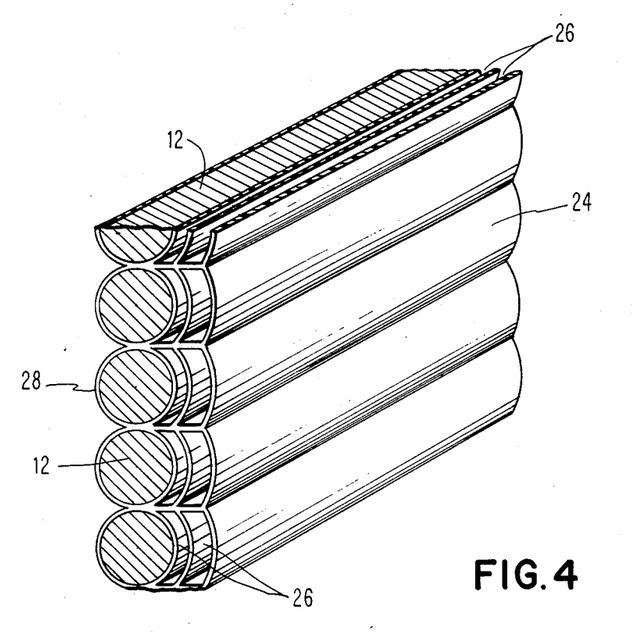
FIG. 4 is a perspective view of a solid state phase change material cast into the channels of a multichannel extruded sheet, wherein the channels have a curvilinear shape.

FIG. 4 is a perspective view of a structural member 24 composed of a multichannel extruded sheet of structural polymeric material, wherein the channels are curvilinear in shape.

In FIGS. 3 and 4, a solid-state phase change material 12 is cast into the large capacity polygon-shaped channels 22 (FIG. 3), and large capacity curvilinear channels 28 (FIG. 4). The small capacity polygon-shaped channels 20 in FIG. 3, as well as the small capacity curvilinear channels 26 in FIG. 4 are unfilled.

Although FIGS. 3 and 4 depict a solid-state phase change material cast into the full capacity of the respective large capacity polygon and curvilinear shaped channels, in certain instances, it can be expedient for the solid-state phase change material to occupy less than the full capacity of the large capacity channel.

Alternatively, the present invention contemplates casting the solid-state phase change material into one or more small capacity channels, alone or in combination with phase change material which has been cast into the large capacity channels. In all circumstances, the casting of the solid-state phase change material does not have to occupy the full capacity of the respective channels.

Multichannel panels such as those illustrated in FIGS. 3 and 4 are suitable for Trombe wall and skylight applications. They contain their own external glazing equivalent to a double-pane glass window in insulating quality. They can also provide solar heat storage and diffuse daylight through the same aperture.

Multichannel structural members containing phase change materials have the following advantages:

1. Strength—The polymer facing provides the same kind of strengthening as would a sheet metal facing.
2. Integral Insulation—The unfilled channels serve as convection barriers. The partially filled, multichannel polymer panel can serve as a self-contained Trombe wall with integral storage and integral external glazing.
3. Diffuse Daylighting Option—The cast solid-state phase change material is a diffusely transparent material which transmits significant visible daylight while absorbing a large fraction of the solar infrared. Thus, the panel can serve as a daylight source and a thermal storage wall simultaneously.

Various proportions of phase change materials can be mixed to obtain desired solid-state transition temperatures. For example, a suitable mixture of phase change materials having a solid-state transition temperature of 26° C. (79° F.) can contain 52 weight percent of neopentyl glycol plus 48 weight percent of trimethylol ethane (pentaglycerine). Two commercially available multichannel polymer extruded panels to which the phase change materials can be added are Plexiglass S3P polymethyl methacrylate manufactured by Rohm GMBH of Germany (FIG. 3) and R.E.S. 4000 polycarbonate extruded panel marketed by Ramada Industries in the United States (FIG. 4). The ends of the channels can be conveniently sealed, for example, by a silicone caulking compound to preserve their integrity from possible leakage of water into the channels.

Glass can also be used in place of structural polymeric materials and metals to the same advantage.

The following examples disclose specific applications for the composite phase change materials of the present invention.

EXAMPLE 1

HIGH TEMPERATURE COMPOSITE FOR STORING OFF-PEAK ELECTRICAL HEAT

This composite consists of pentaerythritol reinforced with electrically and thermally conductive fibers through which electrical current is passed to heat the material above its solid-state transition temperature of 188° C. The fibers provide a means for efficiently introducing electrical resistance heating, provide mechanical reinforcement for the material and facilitate the conduction of stored heat out of the storage component when needed. Suitable fiber materials include graphite, carbon and aluminum, each of which may be conveniently formed into a felt and subsequently impregnated with the phase change material by simply pouring molten pentaerythritol into a suitable fiber or felt-filled mold.

EXAMPLE 2

INTERMEDIATE TEMPERATURE COMPOSITE FOR STORING SOLAR THERMAL ENERGY IN A THERMAL STORAGE WALL (TROMBE WALL)

Suitable composite materials include 100% neopentyl glycol (NPG) (transition temperature 43° C.=109° F.) or a mixture of neopentyl glycol and trimethylol ethane in proportions ranging from 52% NPG to 22% NPG [transition temperatures 26° C. (79° F.) to 62° C. (144° F.), respectively]. The optimum choice of a phase change material depends upon the relative costs of the component compounds and the specific details of Trombe wall design, and the appropriate transition temperature desired. For example, a Trombe wall with a highly insulating glazing and a solar selective absorber coating on the phase change material wall operates at a higher temperature and requires a higher transition temperature phase change material.

The solid phase change material is cast in a slab and sandwiched between two thin metal sheets. One sheet is decorative in appearance and serves as the interior wall surface which is exposed to the living space. The opposite facing sheet metal contains a coating which has solar selective characteristics, i.e., a high value of solar spectral weighted absorptance and a low value of black body spectral weighted emissivity. Surfaces may also be textured to enhance solar collection by the external surface and/or convective heat transfer from the internal surface. This composite thermal storage panel would be typically mounted in a vertical, south-facing wall behind an external glazing of glass or structural polymeric material.

EXAMPLE 3

LOW TEMPERATURE COMPOSITE FOR STORING SOLAR THERMAL ENERGY IN A THERMAL STORAGE WALL

This composite consists primarily of neopentyl glycol or a mixture of neopentyl glycol and pentaglycerine cast into the horizontal channels of a multichannel, transparent polymer extrusion. A suitable mixture can be 52% by weight neopentyl glycol, with the remainder pentaglycerine. A choice of structural polymeric materials can be used. However, an excellent choice from the standpoint of weatherability is polymethyl methacrylate in a multichannel form as shown in FIG. 3 or 4.

One or more exterior layer channels are left unfilled and provide, in effect, a multiple layer glazing for the integral panel wall. The solid-state phase change material may be filled with a solar radiation absorbing material such as carbon or graphite or it may be left unfilled. If unfilled, the wall panel may also be used to provide diffuse daylighting in addition to stored solar heat.

EXAMPLE 4

MODEL HOUSE

A thermal network model house was developed having phase change material Trombe walls.

Table 3 lists the characteristics of the model house. A base building annual heating load of 11.7 million BTU was determined from a SERIRES simulation assuming an adiabatic south facing wall for the purpose of calculating solar savings fraction. SERIRES is a Solar Energy Research Institute (SERI) computer program used to model the thermal/solar performance of a Residential home. The assumed characteristics of the Trombe wall are listed in Table 4.

TABLE 3

| BUILDING CHARACTERISTICS AND ASSUMPTIONS[a] | |
|---|---|
| Floor area | 1080 ft$^2$ |
| Windows | double glazed |
| Ceiling | R36 |
| Walls | R11 |
| Crawl space walls | R19 |
| Infiltration | 0.5 air changes per hour |
| Internal gains | 53,000 BTU/day |
| Heating Setpoint | 60° F. |
| Venting Setpoint | 76° F. |
| Cooling Setpoint | 78° F. |

[a]Retrofit Test House at SERI - Denver, CO/O (modeled as a single thermal zone).

TABLE 4

| TROMBE WALL CHARACTERISTICS AND ASSUMPTIONS | |
|---|---|
| Area | 200 ft$^2$ |
| Glazing | double |
| Overhang | 2.25 ft, 1.0 ft above top of glazing |
| Vent area | 3% |
| Concrete (modeled with a | |
| Thermal conductivity (k) | 0.7576 Btu/ft °F. h |
| Density, (p) | 140 lb/ft$^3$ |
| Specific heat, (c) | 0.2 Btu/lb °F. |
| Phase change materials (modeled without supercooling with six thermal nodes) | |
| Density, (p) | 66.55 lb/ft$^3$ |
| Specific heat, (c) | 0.5996 Btu/lb °F. |
| Heat of transformation, $(Q_t)$ | 52.03 Btu/lb |
| Parameters | |
| Thermal conductivity, (k) | 0.1156 Btu/ft °F. h for base case |
| Transformation temperature, $(T_t)$ | 118.4 ° F. for base case |

Thermal storage was modeled with multiple thermal nodes to account for the effect of the thermal conductivity and the resulting temperature gradients in the wall. For the phase change materials, this multinode modeling used the SERIRES code with multiple single node phase change material layers, each with a specific thermal conductivity.

Simulation results showed hourly Trombe wall surface temperatures and heat fluxes on selected days. Annual solar savings fractions were based on annual simulations with and without the Trombe wall. As a check, the predicted performance of a concrete Trombe wall was compared to the performance predicted by a solar load ratio method. The two predictions agreed well.

Figure 5:
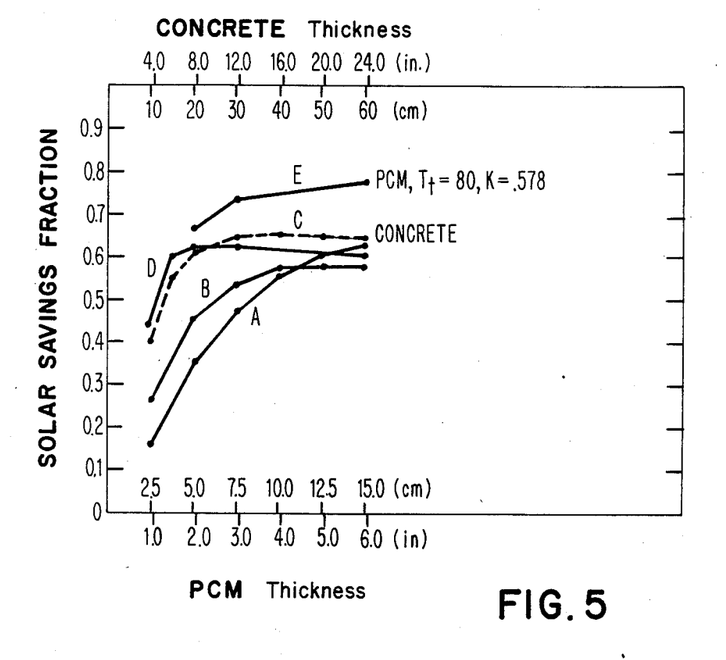
FIG. 5 is a graphical representation of the solar saving fraction as a function of Trombe wall thickness.

FIG. 5 is a graphical correlation of solar savings fraction as a function of Trombe wall thickness, and shows the results of a series of simulations with solid-state phase change temperature and thermal conductivities as parameters. The performance is strongly dependent on both parameters.

Performance of composite phase change material Trombe walls varies over a wide range depending upon material properties.

Material properties for five different cases (A to E) are listed in TABLE 5.

TABLE 5

| | MATERIAL PROPERTIES | | |
|---|---|---|---|
| Case[a] | Transformation Temperature °C. (°F.) | Thermal Conductivity W/m °C. (Btu/ft °F. h) | Heat-Transfer Coefficient W/m² °C. (Btu/ft² °F. h) |
| A | 48 (118) | 1.00 (0.578) | 8.29 (1.46) |
| B | 48 (118) | 0.20 (0.115) | 8.29 (1.46) |
| C | Concrete | 1.31 (0.758) | 8.29 (1.46) |
| D | 29 (84) | 0.20 (0.115) | 8.29 (1.46) |
| E | 27 (80) | 1.00 (0.578) | 8.29 (1.46) |

For case D, performance is approximately equivalent to the performance of a concrete Trombe wall four times as thick. For higher transition temperatures, such as cases A and B, performance is lower. In case E, transition temperature and thermal conductivity are optimized, and solar fractions are 10% to 20% higher than solar fractions for a concrete Trombe wall. It should be noted that the transition temperature and thermal conductivity have been optimized for a 5 cm (2 inch) thick wall and that solar fractions for thicker walls may increase if these properties are optimized for those thicknesses.

For a transition temperature of 20° C. (84° F.), the results indicate that performance will be near optimum if the thermal conductivity of the phase change material is large enough so that the interior surface temperature of the Trombe wall is near the transition temperature even when the phase transition boundary is near the center of the wall.

For a phase transformation temperature of 48° C. (118° F.) and a large thermal conductivity, performance is low because:

(1) during charging, heat is conducted to the interior wall and into the room at such a rate that less of the wall is heated up to the phase transformation temperature, and (2) once charged, the wall discharges and loses heat at an excessive rate. For a phase transformation temperature of 48° C., and a lower thermal conductivity, performance is somewhat improved. The improvement is limited because a tradeoff exists between the discharge and heat loss rates and conduction of heat into the wall during charging.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to falling within the scope of the invention as defined by the claims which follow.

The embodiments of the invention in which an exclusive property or privilege is claimed are defined as follows:

1. A composite material for thermal energy storage comprising a solid state phase change material selected from the group consisting of pentaerythritol, pentaglycerine, neopentyl glycol, tetramethylol propane, monoaminopentaerythritol, diaminopentaerythritol, tris(hydroxymethyl)acetic acid, and mixtures thereof; said solid state phase change material contacting materials selected from the group consisting of metals, carbon siliceous, plastic, cellulosic, natural fiber, artificial fiber, concrete, gypsum, porous rock, and mixtures thereof.

2. The composite material of claim 1, wherein said solid state phase change material incorporates particulate additions of materials selected from the group consisting of metals, carbon, plastic, silica, and mixtures thereof.

3. The composite material of claim 1, wherein said solid state phase change material incorporates fibrous materials selected from the group consisting of glass, carbon, silica, natural fabric, artificial fabric, metals, and mixtures thereof.

4. The composite material of claim 1, wherein said solid state phase change material comprises a component of a passive solar thermal storage unit.

5. The composite material of claim 4, wherein said passive solar thermal storage unit is a Trombe wall.

6. The composite material of claim 4, comprising a component of the floor, wall, or ceiling of a structure.

7. The composite material of claim 1, comprising a heat transfer or heat exchanging material.

8. The composite material of claim 1, wherein the materials contacting said solid state phase change material comprise structural members.

9. The composite material of claim 8, wherein said structural members are selected from the group consisting of single layer, multi-channel, and multi-layer, multi-channel members containing said polyol.

10. The composite material of claim 1, wherein said solid state phase change material is laminated between facing sheets comprising said contact materials.

11. The composite material of claim 10, wherein said solid state phase change material also include additives of said contact materials.

12. The composite material of claim 10, wherein said laminate contains at least one interior sheet of said contact material.

13. The composite material of claim 10, wherein the facing sheets of said laminate are textured.

14. The composite material of claim 10, wherein the facing sheets of said laminate are non-textured.

15. The composite material of claim 1, wherein said solid state phase change material is impregnated with said contact material.

16. The composite material of claim 12, wherein said solid state phase change material is impregnated with contact materials selected from the group consisting of cellulose, natural fabric fibers, artificial fabric fibers, metal fibers, plastic fibers, and mixtures thereof.

17. The composite material of claim 12, wherein said solid state phase change material is impregnated into porous contact materials.

18. The composite material of claim 17, wherein said porous contact materials are selected from the group consisting of cement, concrete, rock, cellulose, gypsum, and vermiculite.

19. A method for impregnating a solid-state phase change material into porous and/or fibrous previously solidified solid substances comprising:
   contacting a water solution of the phase change material with the solid-state phase change material to effect impregnating the solid material with the phase change material and removing the water in a manner to rigidly bind residue phase change material to the solid material.

20. The method of claim 19, wherein said water solution is saturated with said phase change material.

21. The method of claim 19, wherein said water solution is heated.

22. The method of claim 19, wherein the porous and/or fibrous substances are heated.

23. The method of claim 19, wherein the porous and/or fibrous substances are selected from the group consisting of wood, wood products, gypsum, cement, concrete, clay, rock, glass, natural fiber, artificial fiber, metal fiber, plastic fiber, and mixtures thereof.

24. The method of claim 19, wherein the contacting is conducted under vacuum.

25. A method for impregnating stone-like construction materials formed from a coalition of previously solidified solid precursor particles into a solid mass comprising:
   contacting a sufficient amount of solid-state phase change material with water to form a solution;
   utilizing a previously solidified porous aggregate solid material that is compatible with the particles forming the construction material;
   contacting the solution of the solid-state phase change material with the porous aggregate in a manner to effect impregnating the aggregate material with the solid-state phase change material and rigidly binding the residue solid-state phase change material to the aggregate material;
   contacting the porous aggregate material impregnated with the phase change material with the precursor particles of the construction material to form a combined mass; and
   coalescing the combined mass into a solid mass to form the stone-like construction material.

26. The method of claim 25, wherein said solid mass comprises cement, mortar, concrete, porous aggregate, and mixtures thereof.

27. The method of claim 25, wherein the porous aggregate material is selected from the group consisting of vermiculite, perlite, other porous aggregate, and mixtures thereof.

28. A method of impregnating stone-like construction materials formed from a coalition of precursor particles into a solid mass comprising:
   contacting a sufficient amount of solid-state phase change material with water to form a solution, contacting the solution of phase change material with a porous aggregate material that is compatible with the particles forming the construction materials;
   contacting the porous aggregate-phase change material with the precursor particles of the construction material to form a combined mass; and
   coalescing the combined mass into a solid mass to form a stone-like construction material, and wherein said phase change material is selected from the group consisting of pentaerythritol, penthglycerine, neopentyl glycol, tetramethylol propane, monoaminopentaerythritol, diaminopentaerythritol, tris(hydroxymethyl)acetic acid, and mixtures thereof.

* * * * *